(12) United States Patent
Ye

(10) Patent No.: US 11,501,295 B2
(45) Date of Patent: Nov. 15, 2022

(54) OBJECT DISTRIBUTION PROCESSING

(71) Applicant: Advanced New Technologies Co., Ltd., Grand Cayman (KY)

(72) Inventor: Guojun Ye, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/779,239

(22) Filed: Jan. 31, 2020

(65) Prior Publication Data

US 2020/0167771 A1 May 28, 2020

Related U.S. Application Data

(63) Continuation of application No. PCT/CN2020/071354, filed on Jan. 10, 2020.

(30) Foreign Application Priority Data

Jul. 24, 2019 (CN) .......................... 201910673011.9

(51) Int. Cl.
*G06Q 20/38* (2012.01)
*H04L 9/30* (2006.01)
(Continued)

(52) U.S. Cl.
CPC ....... *G06Q 20/389* (2013.01); *G06Q 20/3825* (2013.01); *G06Q 20/3829* (2013.01);
(Continued)

(58) Field of Classification Search
CPC ............ G06Q 20/389; G06Q 30/0609; G06Q 30/0277; G07F 17/3288; H04L 63/123;
(Continued)

(56) References Cited

U.S. PATENT DOCUMENTS 5,592,530 A * 1/1997 Brockman .......... H04M 3/2254
370/250
6,443,843 B1 * 9/2002 Walker ................... G06Q 20/20
463/42
(Continued)

FOREIGN PATENT DOCUMENTS

CN          104978335          10/2015
CN          104978335 A     * 10/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Neha Patel
*Assistant Examiner* — Jahed Ali
(74) *Attorney, Agent, or Firm* — Fish & Richardson P.C.

(57) ABSTRACT

The present disclosure provides an object distribution processing method, device, and system. The object distribution processing method includes: receiving, by an object distribution server, content of an object distribution transaction from a blockchain node, where the content of an object distribution transaction includes a transaction hash specific to the object information to be distributed; after the object distribution server reaches a distribution start time, receiving object distribution requests from a plurality of clients; determining a corresponding award winner from a plurality of object distribution requests; and sending an object distribution message with the hash value to the award winner. With this method, the tamper-resistant characteristic of transaction content in a blockchain is used, and a proof for a transaction hash value specific to initial object information
(Continued)

is provided for a user, thereby improving fairness of an object distribution service.

19 Claims, 8 Drawing Sheets

(51) Int. Cl.
| | | |
|---|---|---|
| *H04L 9/40* | (2022.01) | |
| *H04L 9/06* | (2006.01) | |
| *G06Q 20/40* | (2012.01) | |
| *G06Q 30/06* | (2012.01) | |
| *G06F 8/30* | (2018.01) | |
| *H04L 9/00* | (2022.01) | |

(52) U.S. Cl.
CPC ..... *G06Q 20/4014* (2013.01); *G06Q 30/0609* (2013.01); *H04L 9/0637* (2013.01); *H04L 9/3073* (2013.01); *H04L 63/123* (2013.01); *G06F 8/31* (2013.01); *G06Q 2220/00* (2013.01); *H04L 9/50* (2022.05)

(58) Field of Classification Search
CPC .. H04L 9/0637; H04L 9/3073; H04N 21/2541
See application file for complete search history.

(56) References Cited

U.S. PATENT DOCUMENTS

| | | | | |
|---|---|---|---|---|
| 6,996,536 | B1* | 2/2006 | Cofino | G06Q 30/06 705/26.8 |
| 7,835,936 | B2* | 11/2010 | Ouimet | G06Q 30/0202 705/7.31 |
| 9,021,051 | B1* | 4/2015 | Taller | G06F 16/325 709/213 |
| 9,235,814 | B2* | 1/2016 | Wang | G06N 5/025 |
| 10,282,740 | B1* | 5/2019 | Bramwell | G06Q 30/0239 |
| 10,474,762 | B2* | 11/2019 | Shah | G06T 11/206 |
| 2002/0087888 | A1* | 7/2002 | Yamakawa | H04L 67/025 726/11 |
| 2002/0174023 | A1* | 11/2002 | Grey | G06Q 40/04 705/37 |
| 2003/0121029 | A1* | 6/2003 | Harrison, III | G06F 8/4441 717/151 |
| 2004/0059644 | A1* | 3/2004 | Blau | G06Q 30/08 705/26.3 |
| 2005/0172027 | A1* | 8/2005 | Castellanos | H04L 41/5009 709/229 |
| 2006/0288228 | A1* | 12/2006 | Botz | H04L 63/08 713/182 |
| 2008/0005220 | A1* | 1/2008 | Tsunakawa | G06F 9/466 709/201 |
| 2008/0288496 | A1* | 11/2008 | Duggirala | G06F 9/526 |
| 2011/0219209 | A1* | 9/2011 | Reynolds | G06F 9/30 712/16 |
| 2011/0313840 | A1* | 12/2011 | Mason | G06Q 30/0235 705/14.35 |
| 2012/0030048 | A1* | 2/2012 | Manley | G06Q 20/02 705/26.1 |
| 2012/0324449 | A1* | 12/2012 | Huetter | G06F 9/5066 718/1 |
| 2014/0006281 | A1* | 1/2014 | Leber | G06Q 20/204 705/44 |
| 2015/0134831 | A1* | 5/2015 | Hiroishi | H04L 67/1008 709/226 |
| 2015/0220578 | A1* | 8/2015 | Hunt | G06F 16/137 707/747 |
| 2016/0335728 | A1* | 11/2016 | Pomer | G06Q 40/128 |
| 2017/0111247 | A1* | 4/2017 | Uchiyama | G06F 3/1204 |
| 2017/0287278 | A1* | 10/2017 | Ito | A63F 13/795 |
| 2017/0323294 | A1* | 11/2017 | Rohlfing | G06Q 20/3825 |
| 2018/0137512 | A1* | 5/2018 | Georgiadis | H04L 63/126 |
| 2018/0204034 | A1* | 7/2018 | Tonnelier | G06Q 30/0185 |
| 2019/0089713 | A1* | 3/2019 | Leftwich | H04L 67/322 |
| 2019/0114343 | A1* | 4/2019 | Guo | G06N 3/084 |
| 2019/0130698 | A1* | 5/2019 | Simons | G07F 17/3223 |
| 2019/0165931 | A1* | 5/2019 | Bharti | G07F 15/008 |
| 2019/0213633 | A1* | 7/2019 | Kokernak | G06F 21/62 |
| 2019/0215564 | A1 | 7/2019 | Webb et al. | |
| 2019/0334730 | A1* | 10/2019 | Endress | H04L 9/3247 |
| 2019/0340362 | A1* | 11/2019 | Wright | H04L 9/0643 |
| 2019/0354393 | A1* | 11/2019 | Sugita | G06F 9/45558 |
| 2019/0369979 | A1* | 12/2019 | Woods | G06F 16/137 |
| 2020/0074461 | A1* | 3/2020 | DeRosa-Grund | G06Q 30/0255 |
| 2020/0162578 | A1* | 5/2020 | Appajanna | H04L 67/325 |
| 2020/0167771 | A1* | 5/2020 | Ye | G06Q 20/3827 |
| 2020/0274706 | A1* | 8/2020 | Graham | H04L 63/0876 |
| 2020/0382285 | A1* | 12/2020 | Nuzzi | G06F 16/50 |
| 2021/0019394 | A1* | 1/2021 | Liu | G06F 9/526 |
| 2021/0272017 | A1* | 9/2021 | Singla | G06K 9/6259 |

FOREIGN PATENT DOCUMENTS

| | | | | |
|---|---|---|---|---|
| CN | 107392623 | | 11/2017 | |
| CN | 107392623 | A * | 11/2017 | ........ G06Q 30/0605 |
| CN | 107424036 | | 12/2017 | |
| CN | 107493162 | | 12/2017 | |
| CN | 107742352 | | 2/2018 | |
| CN | 107742352 | A * | 2/2018 | |
| CN | 108550042 | | 9/2018 | |
| CN | 108712395 | | 10/2018 | |
| CN | 109074433 | | 12/2018 | |
| CN | 109074434 | | 12/2018 | |
| CN | 109101836 | | 12/2018 | |
| CN | 109255611 | | 1/2019 | |
| CN | 109255611 | A * | 1/2019 | |
| CN | 109255671 | | 1/2019 | |
| CN | 109409935 | | 3/2019 | |
| CN | 109785135 | | 5/2019 | |
| CN | 109829824 | | 5/2019 | |
| CN | 110046482 | | 7/2019 | |
| CN | 110490640 | | 11/2019 | |
| CN | 110490640 | A * | 11/2019 | |
| TW | 201901511 | | 1/2019 | |
| WO | WO-2007089232 | A1 * | 8/2007 | ............ G06Q 50/34 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/071354, dated Apr. 21, 2020, 22 pages (with machine translation).

* cited by examiner

OBJECT DISTRIBUTION PROCESSING

CROSS-REFERENCE TO RELATED APPLICATIONS

This application is a continuation of PCT Application No. PCT/CN2020/071354, filed on Jan. 10, 2020, which claims priority to Chinese Patent Application No. 201910673011.9, filed on Jul. 24, 2019, and each application is hereby incorporated by reference in its entirety.

TECHNICAL FIELD

The present disclosure relates to the field of Internet technologies, and in particular, to an object distribution processing method, device, and system.

BACKGROUND

In flash sale/shopping spree scenarios, a merchant publishes award content through a shopping free platform, and interested users snap up products at specified time through the shopping spree platform (for example, PINDUODUO, MEITUAN, or JINGDONG platform).

However, in the existing technology, after transferring product A for flash sale (for example, one Apple iPhone) to a server of the shopping spree platform, the merchant can technically change the product content transferred to the server of the shopping spree platform from product A to product B (for example, one apple) after the flash sale ends. ("iPhone" is a trademark of Apple Inc.)

As such, the users spend much time in snapping up coupons, but the users cannot get the products promised by the merchant (for example, the users only get one apple) because of dishonesty of the merchant. In addition, the users cannot get reliable proofs to safeguard their rights, and the users make complaints about the shopping free platform, resulting in a degraded reputation of the shopping spree platform.

SUMMARY

The present disclosure provides an object distribution processing method, device, and system. With the method, device, and system, an object distribution server receives, from a blockchain, a transaction hash value specific to object information of objects to be distributed, and sends an object distribution message including the transaction hash value to an award winner. As such, the tamper-resistant characteristic of data in the blockchain is used, and a proof for denial of a merchant in a flash sale service is provided for a user, thereby enhancing fairness of the flash sale service and improving word of mouth and reputation of a shopping spree platform.

According to an aspect of the present disclosure, an object distribution processing method is provided. The method is performed by an object distribution server and includes: obtaining content of an object distribution transaction from a blockchain node in a blockchain network, where the content of the object distribution transaction includes a first transaction hash value specific to object information of objects to be distributed and an object distribution rule, and the object distribution rule specifies a distribution start time and an object distribution quantity; upon reaching the distribution start time, receiving one or more object distribution requests from one or more clients, where the object distribution request includes a client identifier; determining one or more object distribution messages based on an order of respective times of receipt of the one or more object distribution requests and the object distribution quantity, where the object distribution message includes a client identifier and the first transaction hash value; and sending each of the one or more object distribution messages to a client identified by the client identifier in the object distribution message.

Optionally, in an example of the previous aspect, the content of an object distribution transaction includes an AtomicInteger, and determining one or more object distribution messages based on an order of respective times of receipt of the one or more object distribution requests and the object distribution quantity includes: sorting the one or more object distribution requests by using the AtomicInteger and based on the order of respective times of receipt of the one or more object distribution requests; and determining the one or more object distribution messages based on the sorted one or more object distribution requests and the object distribution quantity.

Optionally, in an example of the previous aspect, the object distribution rule specifies an object acquisition quantity limit, where the object acquisition quantity limit is used to indicate a limit on the quantity of objects that can be obtained by each client, and determining one or more object distribution messages based on an order of respective times of receipt of the one or more object distribution requests and the object distribution quantity includes: determining one or more object distribution messages based on an order of respective times of receipt of the one or more object distribution requests, the object distribution quantity, and the object acquisition quantity limit.

Optionally, in an example of the previous aspect, the content of an object distribution transaction includes a public key in a private key/public key pair, the first transaction hash value is a hash value specific to object information of objects to be distributed and an object information signature, and the object information signature is obtained by encrypting the object information by using a private key in the private key/public key pair, where the object distribution information includes the public key used by the client to verify the object information.

Optionally, in an example of the previous aspect, obtaining content of an object distribution transaction from a blockchain node includes: obtaining a second transaction hash value from the blockchain node, where the second transaction hash value is a hash value specific to the content of an object distribution transaction; and obtaining the content of an object distribution transaction from the blockchain node based on the second transaction hash value.

Optionally, in an example of the previous aspect, before the step of determining one or more object distribution messages based on an order of respective times of receipt of the one or more object distribution requests and the object distribution quantity, the method further includes: performing qualification filtering on the one or more object distribution requests, and determining one or more object distribution messages based on an order of respective times of receipt of the one or more object distribution requests and the object distribution quantity includes: determining one or more object distribution messages based on the order of respective times of receipt of the one or more object distribution requests on which qualification filtering is performed and the object distribution quantity.

According to another aspect of the present disclosure, an object distribution processing method is provided. The device includes: a distribution transaction content acquisition unit, configured to obtain content of an object distribution transaction from a blockchain node in a blockchain network, where the content of an object distribution transaction includes a first transaction hash value specific to object information of objects to be distributed and an object distribution rule, and the object distribution rule specifies a distribution start time and an object distribution quantity; an object distribution request receiving unit, configured to: upon reaching the distribution start time, receive one or more object distribution requests from one or more clients, where the object distribution request includes a client identifier; an object distribution message determining unit, configured to determine one or more object distribution messages based on an order of respective times of receipt of the one or more object distribution requests and the object distribution quantity, where the object distribution message includes a client identifier and the first transaction hash value; and an object distribution message sending unit, configured to send each of the one or more object distribution messages to a client identified by the client identifier in the object distribution message.

Optionally, in an example of the previous aspect, the content of an object distribution transaction includes an AtomicInteger, and the object distribution message determining unit includes: a sorting module, configured to sort the one or more object distribution requests by using the AtomicInteger and based on the order of respective times of receipt of the one or more object distribution requests; and an object distribution message determining module, configured to determine the one or more object distribution messages based on the sorted one or more object distribution requests and the object distribution quantity.

Optionally, in an example of the previous aspect, the object distribution rule specifies an object acquisition quantity limit, where the object acquisition quantity limit is used to indicate a limit on the quantity of objects that can be obtained by each client, and the object distribution message determining unit is configured to: determine one or more object distribution messages based on an order of respective times of receipt of the one or more object distribution requests, the object distribution quantity, and the object acquisition quantity limit.

Optionally, in an example of the previous aspect, the content of an object distribution transaction includes a public key in a private key/public key pair, the first transaction hash value is a hash value specific to object information of objects to be distributed and an object information signature, and the object information signature is obtained by encrypting the object information by using a private key in the private key/public key pair, where the object distribution information includes the public key used by the client to verify the object information.

Optionally, in an example of the previous aspect, the object distribution request receiving unit is configured to: obtain a second transaction hash value from the blockchain node, where the second transaction hash value is a hash value specific to the content of an object distribution transaction; and obtain the content of an object distribution transaction from the blockchain node based on the second transaction hash value.

Optionally, in an example of the previous aspect, the device further includes a qualification filtering unit, configured to perform qualification filtering on the one or more object distribution requests, and the object distribution message determining unit is configured to: determine one or more object distribution messages based on the order of respective times of receipt of the one or more object distribution requests on which qualification filtering is performed and the object distribution quantity.

Optionally, according to another aspect of the present disclosure, an object distribution processing system is provided, including: an object provider device, configured to send, to a blockchain node in a blockchain network, object information of objects to be distributed and content of an object distribution transaction, so that the blockchain node generates a first transaction hash value and a second transaction hash value respectively based on the object information and the content of an object distribution transaction, where the content of an object distribution transaction includes the first transaction hash value specific to the object information of the objects to be distributed and an object distribution rule, and the object distribution rule specifies a distribution start time and an object distribution quantity; an object distribution server, including the previous object distribution processing device; and one or more clients, configured to send an object distribution request to the object distribution server.

Optionally, in an example of the previous aspect, the content of an object distribution transaction includes a public key in a private key/public key pair, the first transaction hash value is a hash value specific to object information of objects to be distributed and an object information signature, and the object information signature is obtained by encrypting the object information by using a private key in the private key/public key pair, where the object distribution information includes the public key, and the client is configured to verify the object information by using the public key.

Optionally, in an example of the previous aspect, the object provider device and/or the object distribution server is a blockchain node/are blockchain nodes in the blockchain network.

According to another aspect of the present disclosure, a computing device is further provided, including: one or more processors; and a storage device, where the storage device stores an instruction, and when the instruction is executed by the one or more processors, the one or more processors is enabled to perform the previous object distribution processing method.

According to another aspect of the present disclosure, a non-transitory machine readable storage medium is further provided, where the medium stores a computer program, and when the computer program is executed by a machine, the machine is enabled to perform the previous object distribution processing method.

BRIEF DESCRIPTION OF DRAWINGS

The nature and advantages of the present disclosure can be better understood with reference to the following accompanying drawings. In the accompanying drawings, identical components or features can have the same reference sign. The accompanying drawings allow for further understanding of the implementations of the present disclosure and constitute a part of the present specification. The accompanying drawings are used to describe the implementations of the present disclosure together with the following specific implementations, but do not constitute a limitation on the implementations of the present disclosure. In the accompanying drawings.

DESCRIPTION OF IMPLEMENTATIONS

Figure 1:
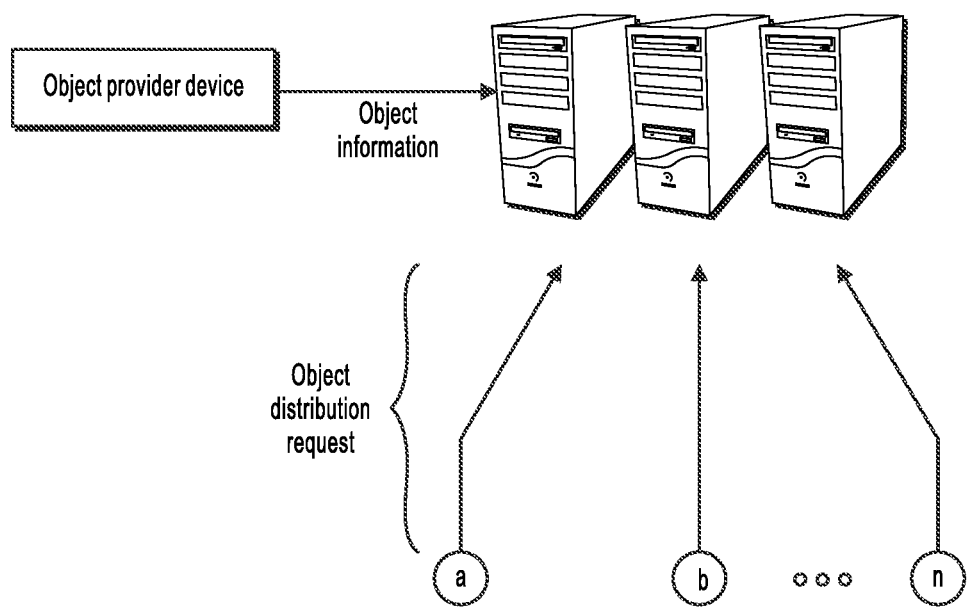
FIG. 1 is a schematic architectural diagram illustrating an object distribution service system, according to the existing technology.

The following describes the subject of the present specification with reference to example implementations. It should be understood that these implementations are merely intended to enable a person skilled in the art to better understand the subject of the present specification, and but not limit the protection scope or applicability of the claims. Functions and arrangements of the described elements can be modified without departing from the protection scope of the present disclosure. Various processes or components can be omitted, replaced, or added in the examples as required. In addition, features described relative to some examples can be combined in other examples.

As used here, the terms "include" and "comprise" and their variants means "including but not limited to". The term "based on" means "at least partially based on". The term "an implementation" means "one or more implementations". The term "another implementation" means "one or more of other implementations". The terms such as "first" and "second" can indicate different or identical objects. Other explicit and implicit definitions can be included below. The definition of a term is consistent throughout the present specification, unless the context clearly indicates otherwise.

In the present specification, the term "object" means a specified article or product. In addition, the term "object distribution" means an article or product distribution task. The term "one or more" means at least one.

The term "blockchain" means a data structure for storing transactions. A blockchain is a linked data structure that is obtained by combining data blocks in chronological order and uses a cryptographic method to prevent the data blocks from being tampered and faked. A blockchain includes one or more blocks. Each block in the blockchain is linked to a preceding block in the blockchain by using the cryptographic hash that includes the preceding block. Each block further includes a timestamp, a cryptographic hash of the block, and one or more transactions. A Merkle tree is formed by hashing transactions that are already verified by the nodes in the blockchain network. In the Merkle tree, data of each leaf node is hashed; and for each branch of the Merkle tree, all hash values of the branch are concatenated at the root of the branch. The previous processing is performed on the Merkle until the root node of the entire Merkle is processed.

The root node of the Merkle tree stores all hash values that represent all data in the Merkle tree. When it is declared that a hash value is a transaction stored in the Merkle tree, quick verification can be performed by determining whether the hash value is consistent with the structure of the Merkle tree.

The term "blockchain network" means a computing node network for managing, updating, and maintaining one or more blockchain structures. Here, blockchain networks can include a public blockchain network, a private blockchain network, and a consortium blockchain network.

The following describes a transaction verification method, device, and system according to the present disclosure with reference to the accompanying drawings.

In an object distribution service, users participate in the object distribution service at a specified time by accessing an object distribution platform by using a client, and a target user (for example, a user that first sends an object distribution request) will obtain an article or a product promised by an object distribution provider.

FIG. 1 is a schematic architectural diagram illustrating an object distribution service system, according to the existing technology.

As shown in FIG. 1, the object distribution service system includes an object distribution provider device, an object distribution server, and a client. Here, the object distribution server can be a single server, a server cluster including a plurality of servers, or another type of non-server processing device or terminal. Here, the object distribution provider publishes promised object information (for example, one Apple iPhone) to an object distribution platform. That is, the object distribution provider device sends the object information to the object distribution server. Then, the object distribution server carries out an object distribution activity specific to the object information. As such, users send object distribution requests to the object distribution server by using clients (for example, mobile phones or computers), to participate in the object distribution activity, so that the object distribution server determines target users. Here, the object distribution server sends an object distribution message (for example, coupon message) to corresponding target clients. As such, after receiving the object distribution message, the target users request the object provider device to provide a corresponding object (for example, one Apple iPhone).

However, the object provider device may technically modify the promised object information in the object distribution server. As a result, the target users cannot get an expected object and have no proof for safeguarding their rights, which degrades fairness of the object distribution service.

Figure 2:
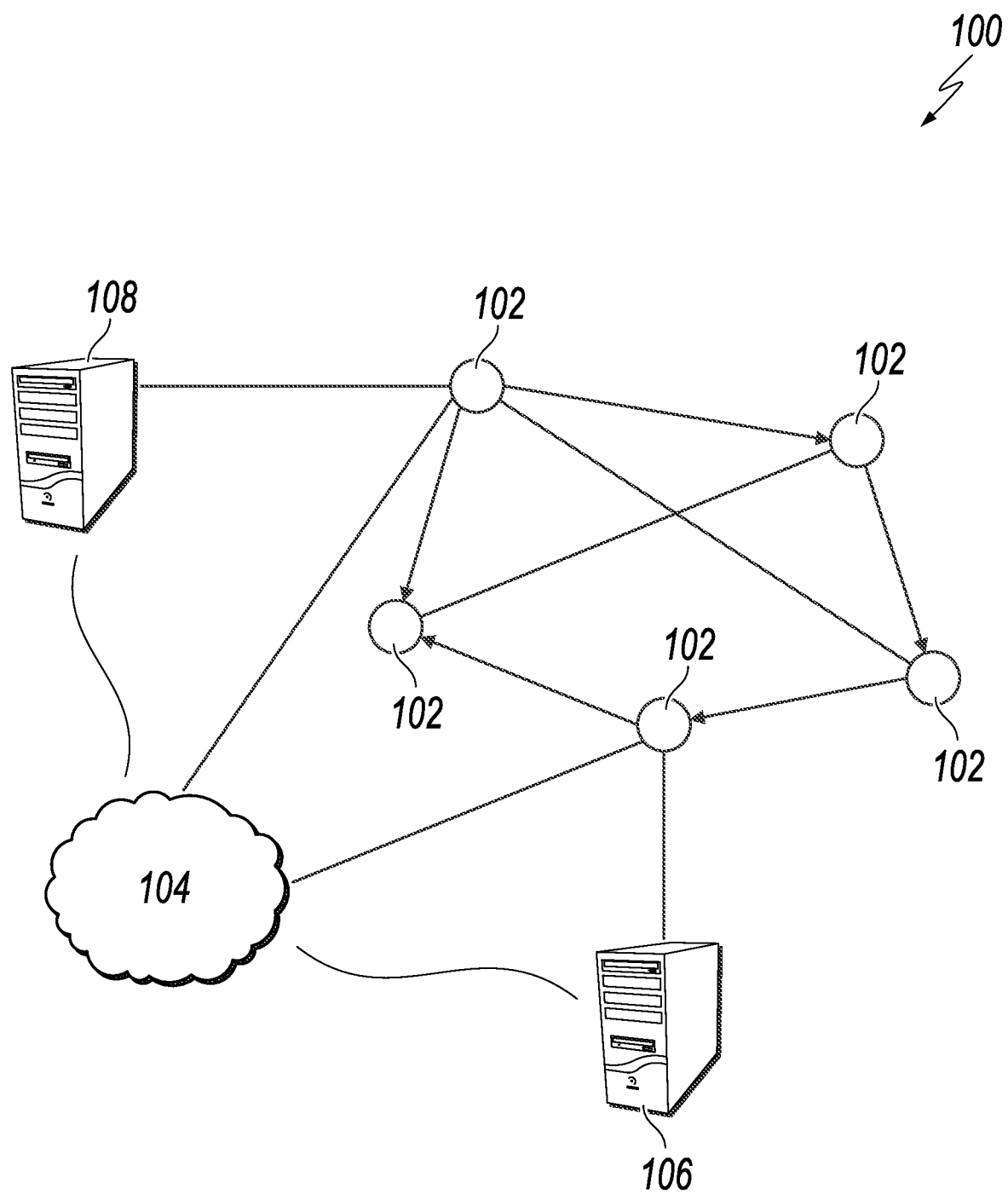
FIG. 2 is a schematic architectural diagram illustrating an object distribution service system, according to the present disclosure.

FIG. 2 is a schematic architectural diagram illustrating an object distribution service system (hereafter also referred to as an object distribution processing system) 100, according to the present disclosure.

In some examples, the system 100 enables entities to participate in a blockchain network 102. As shown in FIG. 2, the system 100 includes a network 104 and computing devices/systems 106 and 108. In some examples, the network 104 can include a local area network (LAN), a wide area network (WAN), the Internet, or a combination thereof, and is connected to a website, a user device (for example, computing devices), and a back-end system. In some examples, the network 104 can be accessed by using a wired communications link and or a wireless communications link. In some examples, the computing devices/systems 106 and 108 communicate with each other through the network 104, and communicate with the blockchain network 102 through the network 104; and nodes (or node devices) in the blockchain network 102 communicate with each other through the network 104. Generally, the network 104 represents one or more communications networks. In some cases, the computing devices/systems 106 and 108 can be nodes in a cloud computing system (not shown); or each of the computing devices/systems 106 and 108 is an independent cloud computing system, which includes a plurality of computers interconnected through the network 104 and is used as a distributed processing system.

In the described examples, each of the computing devices/systems 106 and 108 can include any suitable computing system that can participate in the blockchain network 102 as a node of the blockchain network 102. Examples of the computing device/system include but are not limited to a server, a desktop computer, a note computer, a tablet computer, and a smartphone. In some examples, one or more computer-implementable services used for interaction with the blockchain block 102 can be installed on each of the computing devices/systems 106 and 108. For example, a service of a first entity (for example, user A) can be installed on the computing device/system 106, for example, a service that is used by the first entity to manage transactions between the first entity and one or more of other entities (for example, other users). For example, a service of a second entity (for example, user B) can be installed on the computing device/system 108, for example, a service that is used by the second entity to manage transactions between the second entity and one or more of other entities (for example, other users). In the example shown in FIG. 2, the blockchain network 102 is a peer-to-peer network, and the computing system/device 106 and the computing system/device 108 respectively serve as the nodes of the first entity and the second entity that participate in the blockchain network 102. Here, the blockchain network 102 includes a plurality of nodes, and at least some of the nodes are configured to record information in a blockchain, and the recorded information cannot be changed.

Here, the blockchain network 102 is used to maintain blockchains, and each blockchain includes a plurality of blocks. Transaction data of a plurality of transactions is hashed and stored in blocks. For example, the data of two transactions is hashed to obtain two hash values, and then the two obtained hash values are hashed to obtain another hash value. This process is repeated until a single hash value is obtained for all transactions that need to be stored in blocks. The hash value is called the Merkle root hash value and stored in the head of a block. A change to any transaction will change hash values and finally change the Merkle root hash value.

In this implementation of the present disclosure, the computing devices/systems 106 and 108 can be respectively used to represent an object provider device (or a product back-end server) or an object distribution server (or a product distribution server). That is, the object provider device and/or the object distribution server can participate in object distribution processing as nodes of the blockchain network. Additionally or alternatively, the object provider devices and/or the object distribution servers can be other servers or terminals outside the blockchain network, and these servers or terminals can communicate with the blockchain network by using a protocol (for example, Hypertext Transfer Protocol Secure (HTTPS) and/or a remote procedure call, or communicate with each other through the blockchain network, to implement the object distribution processing.

Figure 3:
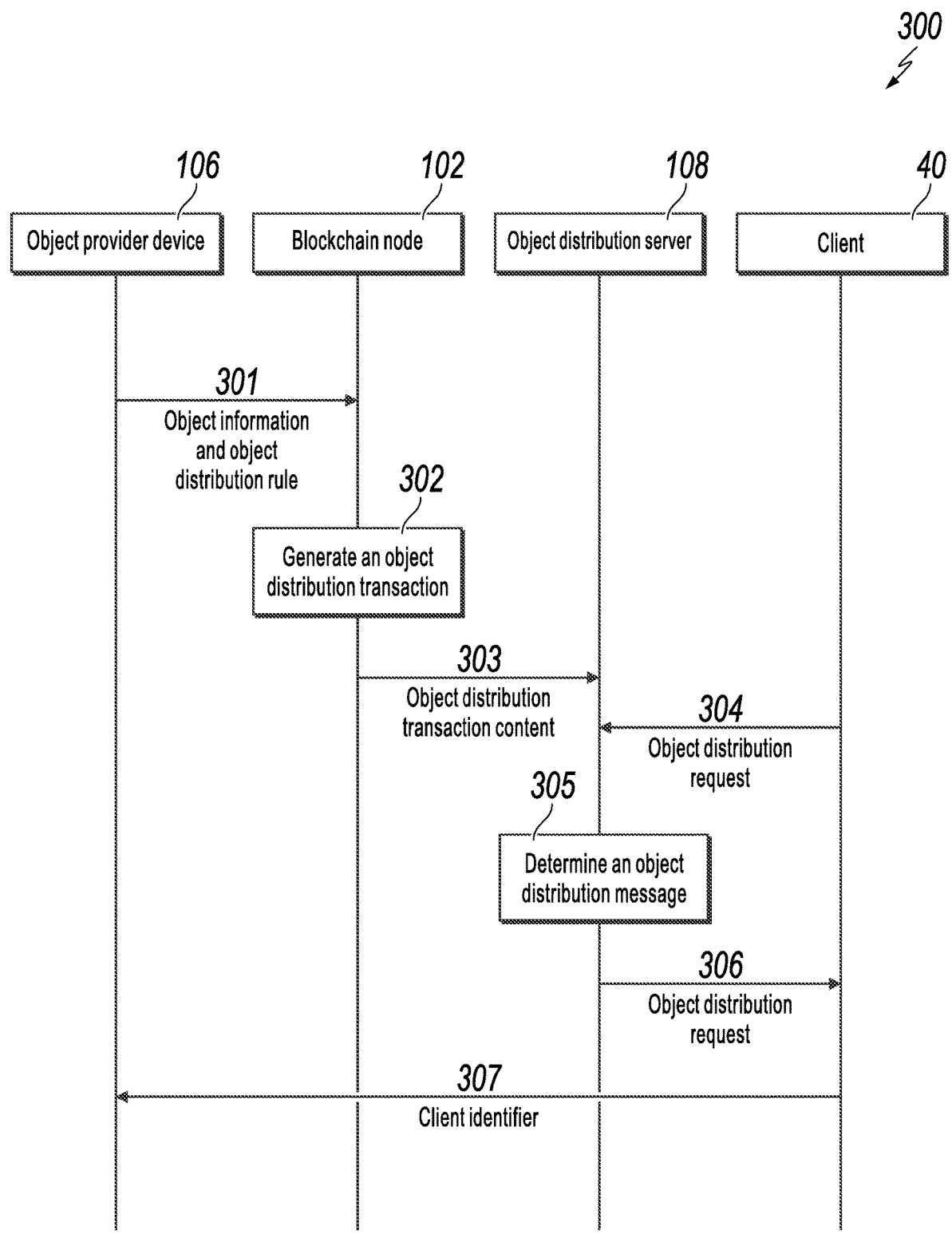
FIG. 3 is a signal timing diagram illustrating an object distribution processing method in an example, according to an implementation of the present disclosure.

FIG. 3 is a signal timing diagram illustrating an object distribution processing method in an example, according to an implementation of the present disclosure.

In process 300 shown in FIG. 3, at block 301, an object provider device 106 sends, to a blockchain node 102, object information to be distributed. Here, the object information can be information about a product or an article to be distributed (for example, product name), and the object provider device 106 can be a server run by a merchant that promises to distribute the product or article. For example, operational staff of the object provider can upload the object information to the object provider device 106, and then the object provider device 106 sends the object information to a blockchain node 102, to request to broadcast the object information to a blockchain network.

In addition, the object provider usually needs to define an object distribution rule such as an object distribution quantity and a distribution start time. In this case, the object distribution provider can send the object distribution rule to an object distribution server 108 through the object provider device 106. However, in an example in the present disclosure, to ensure information transfer security and prevent information from being tampered with, at block 301, the object provider device 106 further sends the object distribution rule to the blockchain node 102, so that the blockchain node 102 generates transaction content of a blockchain transaction based on the object distribution rule, and then the object distribution server 108 obtains the object distribution rule from the transaction content of the blockchain transaction.

Next, at block 302, the blockchain node 102 generates the blockchain transaction based on the object information and the object distribution rule. As described above, the blockchain node 102 can be any node (or node device) in the blockchain network.

Here, the blockchain node 102 can generate different transactions based on the object information and the object distribution rule, for example, an object transaction and an object distribution transaction. The object distribution transaction is cached by the object distribution server 108 for executing a corresponding object distribution task, and the object information in the object transaction content is used to verify that the original object information is not tampered with. Now, the object transaction corresponds to a first transaction hash value, the object distribution transaction corresponds to a second transaction hash value, and the transaction content of the object distribution transaction can include the first transaction hash value.

Next, at block 303, the object distribution server 108 obtains the content of the object distribution transaction from the blockchain node 102. The content of the object distribution transaction further includes the object distribution rule such as an object distribution quantity and a distribution start time.

Specifically, the blockchain node 102 can directly send the transaction content of the object distribution transaction to the object distribution server 108. In addition, the blockchain node 102 can send the second transaction hash value corresponding to the object distribution transaction to the object distribution server 108, and then object distribution server 108 obtains the content of the object distribution transaction from the blockchain node based on the second transaction hash value. For details, references can be made to related descriptions below.

Next, at block 304, upon reaching the distribution start time in the content of the object distribution transaction, the object distribution server 108 receives one or more object distribution requests from one or more clients 40. The object distribution request includes a client identifier, and the client identifier can be information used to uniquely identify a client or a corresponding user, for example, a user ID, a MAC address, or an IP address.

In some cases, a user needs to meet the conditions specified by the object provider before being permitted to participate in an activity of the object distribution service. For example, a user needs to forward a promotion link for 10 times or pay a deposit of one RMB. Correspondingly, the object distribution server 108 can further perform qualification filtering on the received one or more object distribution requests, to filter out the invalid object distribution request of any unqualified user. For example, if a user has not forwarded a promotion link for a specified number of times or has not paid the specified deposit, a corresponding object distribution request is filtered out.

Next, at block 305, the object distribution server 108 determines one or more object distribution messages based on an order of respective times of receipt of the one or more object distribution requests and the object distribution quantity. The object distribution message includes a client identifier and a first transaction hash value, where the client identifier is used to indicate one or more (depending on the object distribution quantity) of a plurality of clients that have sent object distribution requests. Here, the object distribution server sends object distribution messages to only the clients corresponding to the requests that are received before the object distribution quantity is exceeded. In this implementation of the present disclosure, the distribution start time and the object distribution quantity in the object distribution rule are determined based on the content of the object distribution transaction. Based on the tamper-resistant characteristic of the transaction content, the distribution start time and the object distribution quantity cannot be tampered with before an activity of the object distribution service is carried out, thereby ensuring stable operation of the service.

In an example of the present disclosure, the received one or more object distribution requests is sorted by the order of respective times of receipt of the one or more object distribution requests. For example, when receiving an object distribution request, the object distribution server 108 performs sorting for the object distribution request (for example, increasing the sequence number of the object distribution request by 1). If the object distribution quantity is 10, the object distribution server 108 determines that client identifier information corresponding to object distribution requests 1-10 as target users.

Here, an AtomicInteger can be used to sort the received object distribution requests based on a corresponding order of respective times of receipt. In addition, the content of the object distribution transaction can include an AtomicInteger, to record the timing sequence of the object distribution requests in the transaction content. Based on the tamper-resistant characteristic of the transaction data, fairness of the distribution service can be better ensured.

Further, the object distribution rule specifies an object acquisition quantity limit, where the object acquisition quantity limit is used to indicate a limit on the quantity of objects that can be obtained by each client (for example, only one object can be allocated to each customer identifier). Correspondingly, determining one or more object distribution messages based on an order of respective times of receipt of the one or more object distribution requests and the object distribution quantity includes: determining one or more object distribution messages based on an order of respective times of receipt of the one or more object distribution requests, the object distribution quantity, and the object acquisition quantity limit. For example, if a plurality of object distribution requests specific to one client identifier are received within the order of respective times of receipt corresponding to the object distribution quantity, only one object can be allocated to the client identifier.

Next, at block 306, the object distribution server 108 sends each of the one or more object distribution messages to a client identified by the client identifier in each object distribution message. In addition, the object distribution message can further include other specified award information, for example, "congratulations on your successful snap-up of XXX".

Next, at block 307, after receiving an object distribution message, a client 40 sends client identifier information to the object provider device 106. For example, the client 40 sends an object distribution message including the client identifier to the object provider device 106, so that the object provider provides an object to the target user. It is worthwhile to note that the process of providing an object by performing the step at block 307 is only used as an example. Alternatively, an object can be provided to a user by performing another step or using another method. For example, the object distribution server 108 can send the client identifier in each object distribution information to the object provider device 106. As such, the object provider device 106 can directly provide an object to a corresponding target user based on each client identifier.

It is worthwhile to note that, in the existing technology, when a server cluster on an object distribution platform determines a target user based on an object distribution request, as shown in FIG. 1, after receiving an object distribution request, each server in the server cluster accesses a database in which an object distribution quantity (for example, 10) is pre-determined, and performs an inventory reduction operation to determine an object distribution request corresponding to a target user. However, when there are a large quantity of concurrent object distribution requests, if a plurality of servers simultaneously perform the inventory reduction operation, the pressure on the database will increase, and the database system may easily break down. In addition, in the inventory reduction operation, it is difficult to determine the timing sequence of different object distribution requests received by the server; for example, when there are more than 20 requests for reducing database inventory in a database, but there are only 10 objects in the inventory. In this case, generally, the database system can determine a target user through random inventory reduction, which is unfair; or increasing the object distribution quantity (for example, the quantity of products in the inventory), which leads to backordering of the objects.

As described above, in this implementation of the present disclosure, a plurality of object distribution requests are sorted by the order of respective times of receipt, and an award winner is determined by comparing the sorted object distribution requests and the object distribution quantity. Compared with the method for determining an award winner through inventory reduction, this implementation of the present disclosure can effectively reduce the system pressure. In addition, a target object distribution request is determined based on counting, the problem of backordering can be avoided.

It is worthwhile to note that an AtomicInteger can be used for counting when there are a large quantity of concurrent object distribution requests. Currently, the AtomicInteger is mainly used for traffic control to avoid malicious traffic attacks. However, in this implementation of the present disclosure, the AtomicInteger is used to sort one or more object distribution requests based on the order of respective times of receipt, and record a corresponding count in the transaction content. In addition, when a server cluster including a plurality of servers is used on the object distribution platform, a distributed AtomicInteger can be deployed between the plurality of servers, to sort and count all the requests received by the servers in the server cluster.

Figure 4:
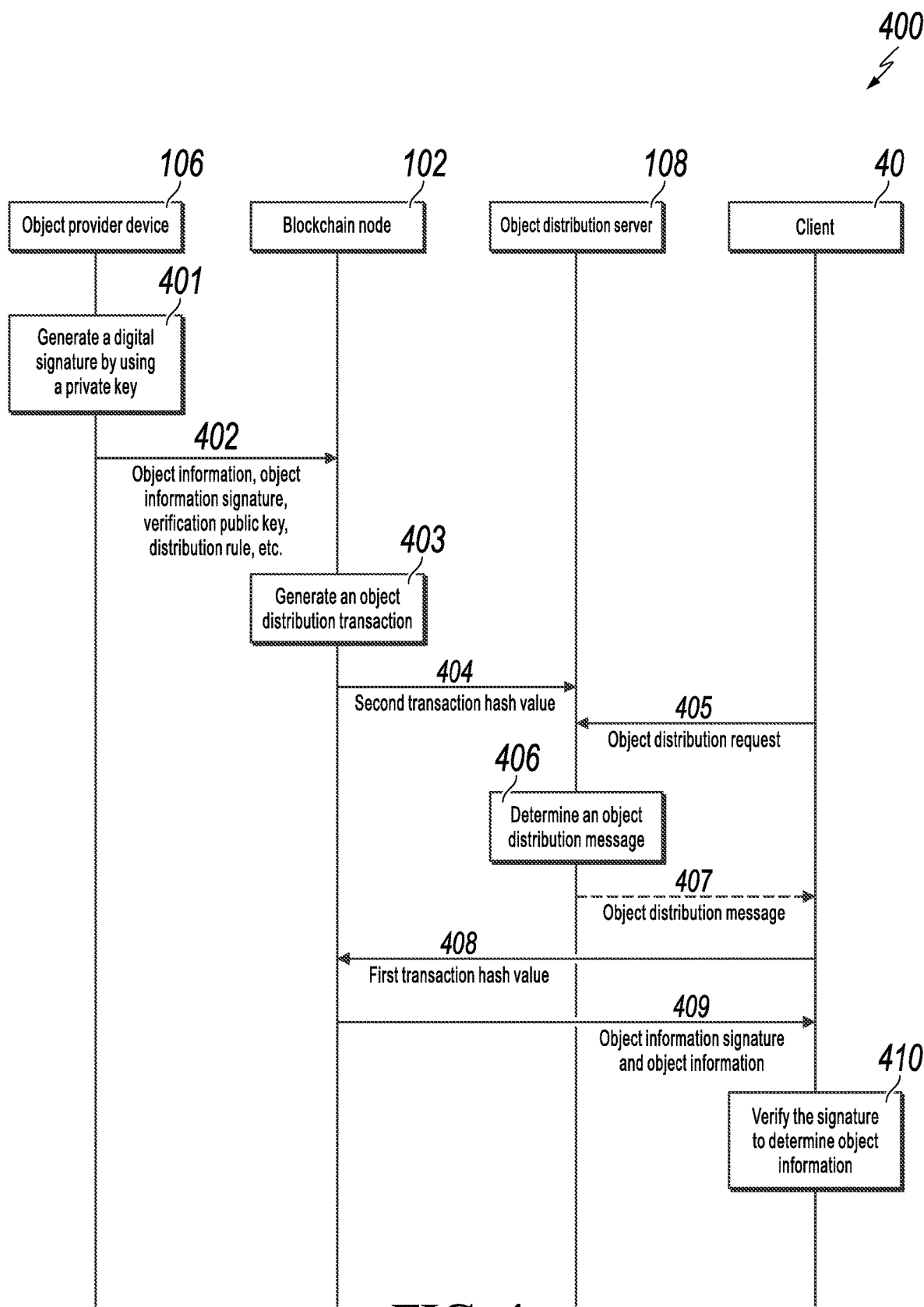
FIG. 4 is a signal timing diagram illustrating an object distribution processing method in an example, according to an implementation of the present disclosure.

FIG. 4 is a signal timing diagram illustrating an object distribution processing method in an example, according to an implementation of the present disclosure.

In some cases, an object provider adds a digital signature on object information to be distributed, to improve security of the information. For example, the object information can be encrypted by using a private key in a private key/public key pair, and a verification public key can be set in an object distribution message. As such, when receiving the object distribution message with the verification public key, the object provider can obtain the digital signature by using the verification public key, to perform verification.

As shown in process 400 in FIG. 4, at block 401, an object provider device 106 obtains a private key/public key pair, and uses the private key in the private key/public key pair to encrypt object information, to generate a corresponding digital signature (or object information signature). Here, the type and source of the private key/public key pair are not limited. For example, the object provider device 106 can obtain the private key/public key pair from any digital key platform or create the private key/public key pair.

Next, at block 402, the object provider device 106 can send information such as the object information, the object information signature, the verification public key, and an object distribution rule to a blockchain node 102.

Next, at block 403, the blockchain node 102 generates object distribution information based on the information received from the object provider device 106, such as the object information, the object information signature, the verification public key, and the object distribution rule. Here, the blockchain node 102 can generate a first transaction hash value corresponding to an object transaction based on the object information signature and the object information, where the first transaction hash value is used as a part of content of an object distribution transaction, and the object distribution transaction also has a corresponding second transaction hash value.

Next, at block 404, the blockchain node 102 sends the generated second transaction hash value to an object distribution server 108. Then, the object distribution server 108 obtains the transaction content of the object distribution transaction in a blockchain based on the second transaction hash value.

Next, at block 405, the object distribution server 108 receives, at the distribution start time, one or more object distribution requests from one or more clients. Here, the distribution start time can be obtained from the content of an object distribution transaction.

Next, at block 406, the object distribution server 108 determines one or more object distribution messages based on an order of respective times of receipt of the one or more object distribution requests and the object distribution quantity. Here, the content of the object distribution transaction includes an object distribution rule such as an object distribution quantity. As such, the object distribution server 108 can determine an object distribution message based on object distribution requests that satisfy the object distribution rule.

Next, at block 407, the object distribution server 108 sends the object distribution transaction message to a corresponding client 40. Here, the object distribution message can include the first transaction hash value corresponding to the object transaction and the verification public key.

Here, after obtaining the verification public key, the client 40 can request the object provider or an object provider platform to perform verification and provide a corresponding object. In addition, when the object provided by the object provider and the object provider platform is different from the promised object, the user needs to obtain a proper proof to safeguard lawful rights of the user.

Next, at block 408, the client 40 sends the first transaction hash value to the blockchain node 102. For example, the client 40 can send the object transaction with the first transaction hash value to the blockchain node 102. As such, the blockchain node 102 can perform verification based on the transaction hash value in the object distribution message, to obtain the object information and object information signature in the transaction content of a matching object transaction.

It should be understood that each blockchain node in the blockchain network is used to maintain same data specific to one or more transactions, and the transactions that have been successfully verified by the nodes in the blockchain network are hashed to form a Merkle tree. In addition, when it is declared that a hash value is a transaction stored in the Merkle tree, quick verification can be performed by determining whether the hash value is consistent with the structure of the Merkle tree. If a matching hash value is obtained, data of a corresponding transaction stored in a corresponding Merkle tree can be found based on the hash value.

As such, when receiving the first transaction hash value, the blockchain node 102 can obtain, through quick verification, object transaction content of a node that is in the Merkle tree and that corresponds to the first transaction hash value, such as object information and object signature information (the blockchain node 102 can obtain transaction content of an object distribution object based on the second transaction hash value with reference to the previous method).

Next, at block 409, the blockchain node 102 sends the object information and object information signature of the matching transaction to the client 40.

Next, at block 410, the client can use the verification public key in the object distribution message to verify the object information signature obtained from the blockchain, that is, to decrypt the object information signature based on the verification public key, so as to obtain decrypted object information. In addition, based on the object information received from the blockchain and the object information obtained by encrypting the object information signature, the original object information initially published by the object provider can be verified, and a correct verification public key of the target user can be determined.

It can be easily understood that the blockchain can ensure that the transaction content in data blocks cannot be tampered with or faked, and the object information is the object information sent by the object provider to the blockchain platform. Therefore, when finding that the obtained object is different from the object promised by the object provider, the target user can use the object information returned by the blockchain node as a proof to safeguard lawful rights of the target user, so that the object distribution service is more trustworthy.

In some implementations, the object provider device 106 and/or the object distribution server 108 can be a blockchain node/blockchain nodes in a blockchain network. Alternatively, dedicated blockchain nodes are provided to provide a blockchain service for the object provider device 106 and the object distribution server 108. As such, when the object provider needs to provide the blockchain service, the object provider device 106 can directly generate a transaction object and an object distribution transaction based on the locally uploaded object information and object distribution rule. Here, the object transaction content includes object information (or object information and an object information signature), and the transaction corresponds to a first transaction hash value. In addition, the object distribution transaction corresponds to the second transaction hash value, and the content of the object distribution transaction includes the distribution start time and the object distribution quantity. However, the object distribution server 108 can receive object distribution requests based on an object distribution transaction, and determine a corresponding target user. Therefore, the object provider device serves as a blockchain node and can directly generate a blockchain transaction based on uploaded information, and the information data uploaded to the blockchain network cannot be tampered with, thereby ensuring fairness of the object distribution service.

Figure 5:
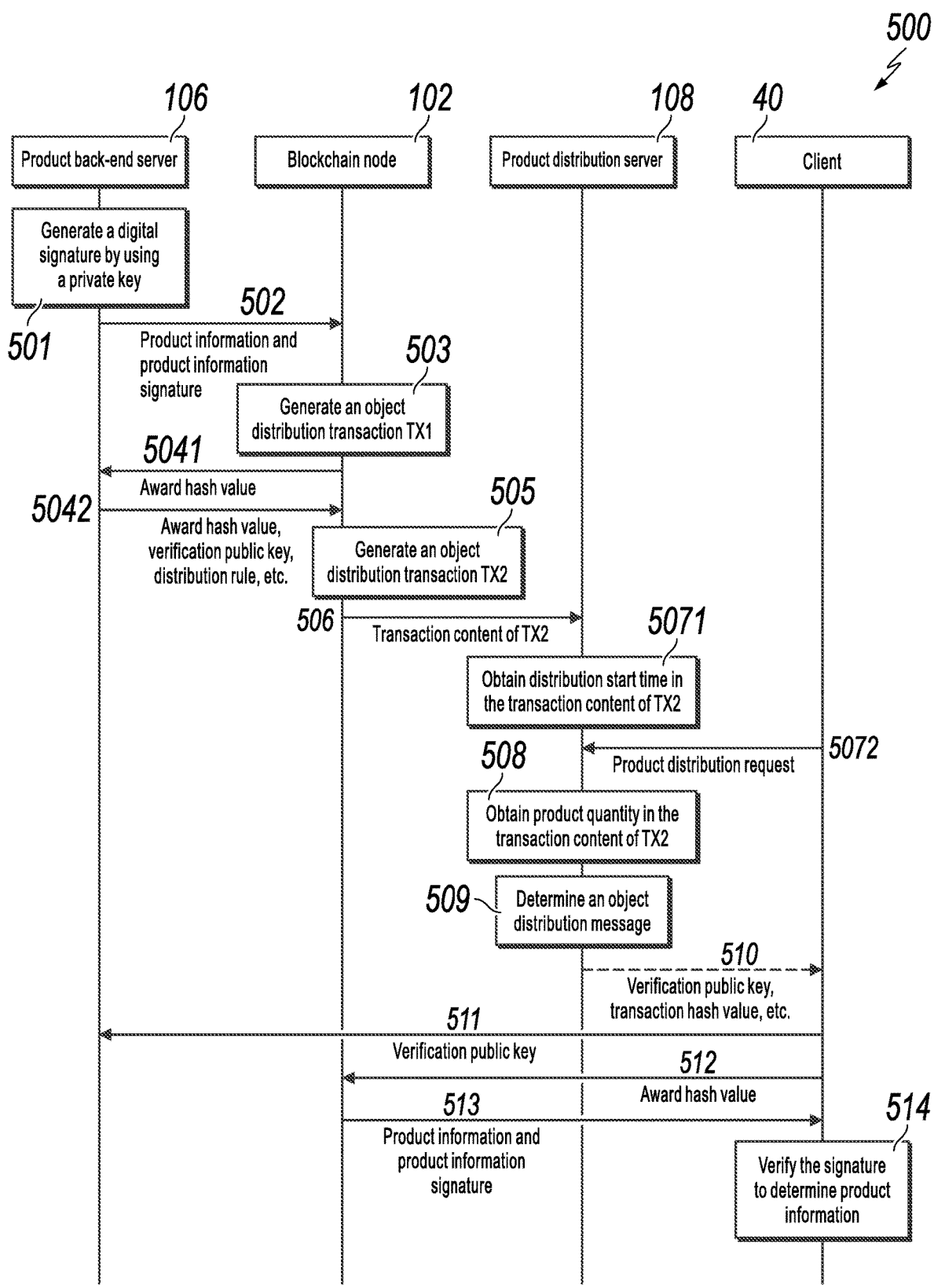
FIG. 5 is a signal timing diagram illustrating an object distribution processing method applied to a shopping spree scenario in an example, according to an implementation of the present disclosure.

FIG. 5 is a signal timing diagram illustrating an object distribution processing method 500 applied to a shopping spree scenario in an example, according to an implementation of the present disclosure.

As shown in process 500 in FIG. 5, at block 501, a merchant uploads product information by using a product back-end server 106, and the merchant can prepare a private key/public key pair, and then the product back-end server 106 encrypts and adds a signature on the product information by using the private key in the private key/public key pair. For example, the product information is "one Apple iPhone", and then the product information is encrypted by using the private key, to obtain a corresponding digital signature (sign).

Next, at block 502, the product back-end server 106 sends the product information and the product information signature to a blockchain node 102 for being transferred to the blockchain network.

Next, at block 503, the blockchain node 102 generates a corresponding product transaction TX1 based on the product information signature and the product information.

For example, transaction content corresponding to the transaction TX1 is shown in Table 1.

TABLE 1

| Product information | One Apple iPhone |
|---|---|
| Product information signature | sign |

Correspondingly, after the information included in the transaction TX1 is hashed, the obtained hash value (hereafter also referred to as an award hash value) of the transaction TX1 is as follows: tx1=0xf7E62B3C48d09b0133b87E7312f4A4f6d2aBCe22.

Next, at block 5041, the blockchain network 102 notifies the product back-end server that the product information is successfully uploaded to the blockchain network, and the notification includes the award hash value.

Next, at block 5042, the product back-end server 106 sends a shopping spree rule and a rule for verifying an award winner (for example, a verification public key) that are specific to the product information as well as the award hash value to the blockchain node 102 for being uploaded to the blockchain network.

Next, at block 505, the blockchain node 102 generates a transaction TX2 based on the verification public key, the award hash value, the shopping spree rule, etc.

For example, transaction content corresponding to the transaction TX2 is shown in Table 2.

TABLE 2

| Award hash value | 0xf7E62B3C48d09b0133b87E7312f4A4f6d2aBCe22 |
|---|---|
| Start time | 2019-2-30 10:00:00 |
| Product inventory quantity | 10 |
| Verification public key | 62B3C48d09b0133b87E7312f4A4f6d2 |
| Atomic integer | For example: incrKey |
| Other rules | For example: A user ID can win a maximum of one Apple iPhone. |

Correspondingly, after the information included in the transaction TX2 is hashed, the obtained hash value of the transaction TX2 is as follows: tx2=0xe7cae62be1049ca29a5b468e6018ff4cfc6870bdfc6750541b8a223fda7d3ed0. Then, the hash value of the transaction TX2 is sent to the product distribution server 108.

In addition, after receiving the verification public key, the blockchain node 102 can also attempt to verify whether the received verification public key matches the product information signature, to ensure that the corresponding information signature can be encrypted by using the verification public key that is uploaded by the merchant to the blockchain network.

Next, at block 506, the product distribution server 108 or each server in the shopping spree server cluster locally caches the transaction content of the transaction TX2. For example, content of a corresponding data block can be retrieved based on the hash value tx2 of the transaction TX2, for example, the following transaction content can be retrieved: award hash value, start time, product quantity, verification key, AtomicInteger, and other rules.

Next, at block 5071, the product distribution server 108 obtains the distribution start time in the transaction content of TX2, and determines, based on the distribution start time, whether to start the shopping spree activity. For example, if the current time is 2019-2-30 10:00:00, the shopping spree activity is started.

Next, at block 5072, the object distribution server 108 receives one or more object distribution requests (or shopping spree request) from one or more clients 40. Here, each shopping spree request includes corresponding client identifier information. It should be understood that the product distribution server 108 can screen the shopping spree qualifications corresponding to all the shopping free requests, to filter out unqualified user requests.

Next, at block 508, the product distribution server 108 can obtain the distribution start time or the product inventory quantity in the transaction content of TX2.

Next, at block 509, the product distribution server 108 can determine a product distribution message (or a coupon message) based on the product inventory quantity, the distribution start time, and other rules. Here, user information or client information that is corresponding to the client identifier in each product distribution request can be determined, to determine the award winner. Compared with other methods for obtaining the product distribution rule (for example, directly obtaining the product distribution rule from the product back-end server 106), in this implementation of the present disclosure, the product distribution rule is obtained from the cached transaction content, and based on the tamper-resistant characteristic of the transaction content, the product distribution rule cannot be tampered with before the shopping spree activity is started.

Here, all target product distribution requests will access a respective AtomicInteger that is configured as a counter, so that a count corresponding to each request can be obtained. For example, the count for a shopping spree request is: user ID=Tony, count=1; user ID=Jerry, count=2, etc. Then, compare each count with the product inventory quantity in the transaction content of TX2 that is locally stored by the product distribution server 108, to determine whether the user ID is an award winner. Compared with the inventory reduction method, this implementation of the present disclosure can save more resources and prevent backordering.

Next, at block 510, the object distribution server 108 can send information such as the object distribution signature, the verification public key, and transaction hash value to the client 40 corresponding to the award winner.

For example, content of the coupon message obtained by the award winner is shown in Table 3.

TABLE 3

| | |
|---|---|
| Award hash value | 0xf7E62B3C48d09b0133b87E7312f4A4f6d2aBCe22 |
| Count | 1 |
| Product inventory quantity | 10 |
| Verification public key | 62B3C48d09b0133b87E7312f4A4f6d2 |

It should be understood that the content of the coupon message that is shown in Table 3 is only used as an example. The coupon message can include more information, for example, the shopping spree rule. Alternatively, the coupon message can include less information, for example, the coupon message does not include the product inventory quantity.

Next, at block 511, the user accesses the merchant's platform or the shopping spree platform to claim the award by using the verification public key. For example, the client 40 sends a coupon message including the verification public key to the product back-end server 106. Then, the product back-end server 106 performs digital signature verification by using the verification public key in the coupon message, and issues the award to the award winner.

In some implementations, when the user claims an award, if the merchant feeds back that the user cannot claim an award because the product information signature is mismatched or feeds back that the user cannot claim the expected award, the user needs to prove that the user is a qualified award winner and should obtain the product promised by the merchant. In this case, at block 512, the client 40 sends the award hash value to the blockchain node 102. For example, the client 40 sends a coupon message including the award hash value to the blockchain node 102. Then, the blockchain node 102 finds the object transaction TX1 based on the award hash value in the coupon message.

Next, at block 513, the blockchain node 102 sends the content of the transaction TX1 (such as the product information signature and the product information) to the client 40.

Next, at block 514, the client 40 can verify the product information signature by using the verification public key in the coupon message. That is, the client 40 uses the verification public key in the coupon message to decrypt the product information signature, to prove that the client has a correct public key, and further determine, based on the product information obtained from the blockchain, whether the original product information is tampered with. As such, the blockchain-based shopping spree solution can ensure better fairness.

Figure 6:
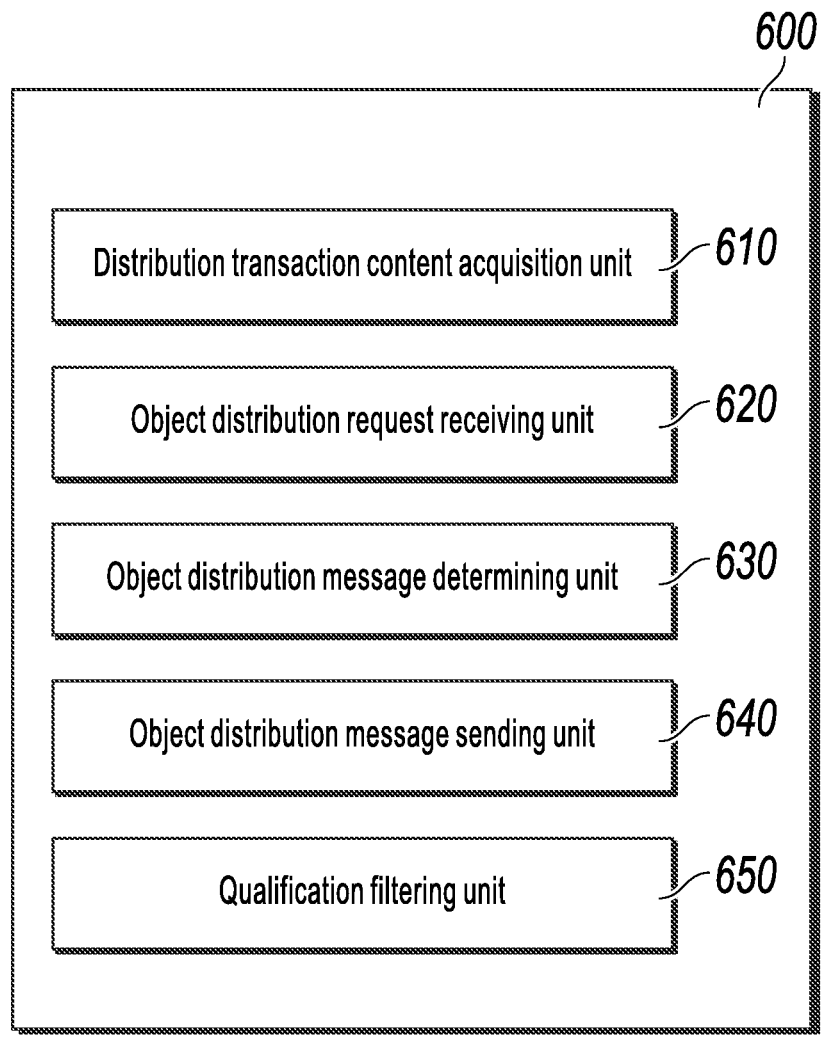
FIG. 6 is a block diagram illustrating an object distribution processing device, according to an implementation of the present disclosure.

FIG. 6 is a block diagram illustrating an object distribution processing device (hereafter also referred to as an object distribution processing device) in an example, according to an implementation of the present disclosure.

As shown in FIG. 6, the object distribution processing device 600 includes a distribution transaction content acquisition unit 610, an object distribution request receiving unit 620, an object distribution message determining unit 630, an object distribution message sending unit 640, and a qualification filtering unit 650.

The distribution transaction content acquisition unit 610 is configured to obtain content of an object distribution transaction from a blockchain node in a blockchain network, where the content of an object distribution transaction includes a first transaction hash value specific to object information of objects to be distributed and an object distribution rule, and the object distribution rule specifies a distribution start time and an object distribution quantity. For operations of the distribution transaction content acquisition unit 610, references can be made to the operations of block 303 described in FIG. 3.

The object distribution request receiving unit 620 is configured to: upon reaching the distribution start time, receive one or more object distribution requests from one or more clients, where the object distribution request includes a client identifier. For operations of the object distribution request receiving unit 620, references can be made to the operations of block 304 described in FIG. 3.

The object distribution message determining unit 630 is configured to determine one or more object distribution messages based on an order of respective times of receipt of the one or more object distribution requests and the object distribution quantity, where the object distribution message includes a client identifier and the first transaction hash value. For operations of the object distribution message determining unit 630, references can be made to the operations of block 305 described in FIG. 3.

The object distribution message sending unit 640 is configured to send each of the one or more object distribution messages to a client identified by the client identifier in the object distribution message. For operations of the object distribution message sending unit 640, references can be made to the operations of block 306 described in FIG. 3.

The qualification filtering unit 650 is configured to perform qualification filtering on the one or more object distribution requests. In this case, the object distribution message determining unit 630 is configured to determine one or more object distribution messages based on the order of respective times of receipt of the one or more object distribution requests on which qualification filtering is performed and the object distribution quantity. For operations of the qualification filtering unit 650, references can be made to the operations of block 304 described in FIG. 3.

It should be understood that the previous structure of the object distribution processing device 600 is only used as an example. Alternatively, the object distribution processing device 600 may include only some of blocks 610-650, for example, the object distribution processing device 600 may not include the qualification filtering unit 650.

Further, the object distribution rule specifies an object acquisition quantity limit, where the object acquisition quantity limit is used to indicate a limit on the quantity of objects that can be obtained by each client, and the object distribution message determining unit 630 is configured to: determine one or more object distribution messages based on an order of respective times of receipt of the one or more object distribution requests, the object distribution quantity, and the object acquisition quantity limit.

Further, the object distribution request receiving unit 620 is configured to: obtain a second transaction hash value from the blockchain node, where the second transaction hash value is a hash value specific to the content of an object distribution transaction; and obtain the content of an object distribution transaction from the blockchain node based on the second transaction hash value.

Further, the content of an object distribution transaction includes a public key in a private key/public key pair, the first transaction hash value is a hash value specific to object information of objects to be distributed and an object information signature, and the object information signature is obtained by encrypting the object information by using a private key in the private key/public key pair, where the object distribution information includes the public key used by the client to verify the object information.

Figure 7:
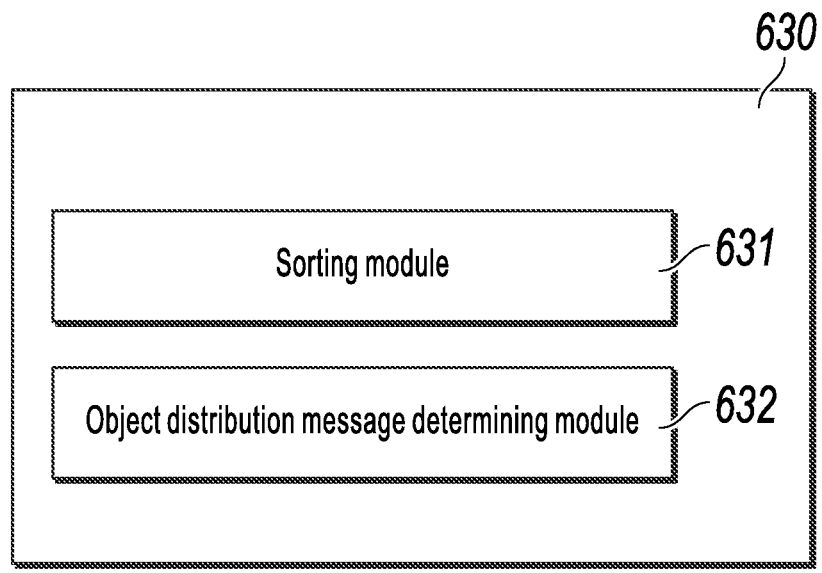
FIG. 7 is a block diagram illustrating an object distribution message determining unit, according to an implementation of the present disclosure.

FIG. 7 is a block diagram illustrating the object distribution message determining unit 630 in an example, according to an implementation of the present disclosure.

As shown in FIG. 7, the object distribution message determining unit 630 includes a sorting module 631 and an object distribution message determining module 632. Here, content of an object distribution transaction includes an AtomicInteger. The sorting module 631 is configured to sort the one or more object distribution requests by using the AtomicInteger and based on the order of respective times of receipt of the one or more object distribution requests. The object distribution message determining module 632 is configured to determine the one or more object distribution messages based on the sorted one or more object distribution requests and the object distribution quantity. For operations of the sorting module 631 and the object distribution message determining module 632, references can be made to the operations of block 305 described in FIG. 3.

As shown in FIG. 2 to FIG. 6, an object distribution service system 100 includes an object distribution provider device 106, an object distribution server 108, and a client 40. In addition, the blockchain node 102 can be disposed outside the object distribution processing system 100, which can be invoked by the object distribution processing system 100 to implement a corresponding object distribution processing service.

The object provider device 106 is configured to send, to a blockchain node in a blockchain network, object information of objects to be distributed and content of an object distribution transaction, so that the blockchain node generates a first transaction hash value and a second transaction hash value respectively based on the object information and the content of an object distribution transaction, where the content of an object distribution transaction includes the first transaction hash value specific to the object information of the objects to be distributed and an object distribution rule, and the object distribution rule specifies a distribution start time and an object distribution quantity.

The object distribution server 108 includes the previous object distribution processing device 600.

The one or more clients 40 are configured to send an object distribution request to the object distribution server.

Further, the content of an object distribution transaction includes a public key in a private key/public key pair, the first transaction hash value is a hash value specific to object information of objects to be distributed and an object information signature, and the object information signature is obtained by encrypting the object information by using a private key in the private key/public key pair. The object distribution information includes the public key, and the client 40 is configured to verify the object information by using the public key.

Further, the object provider device 106 and/or the object distribution server 108 is a blockchain node/are blockchain nodes in the blockchain network.

The forgoing has described the implementations of the object distribution processing method, device, and system according to the present disclosure with reference to FIG. 2 and FIG. 7. Details mentioned in the previous descriptions about the method implementations are also applicable to the device implementations and the system implementations of the present disclosure. The previous object distribution processing device and system can be implemented by using hardware, software, or a combination of hardware and software.

Figure 8:
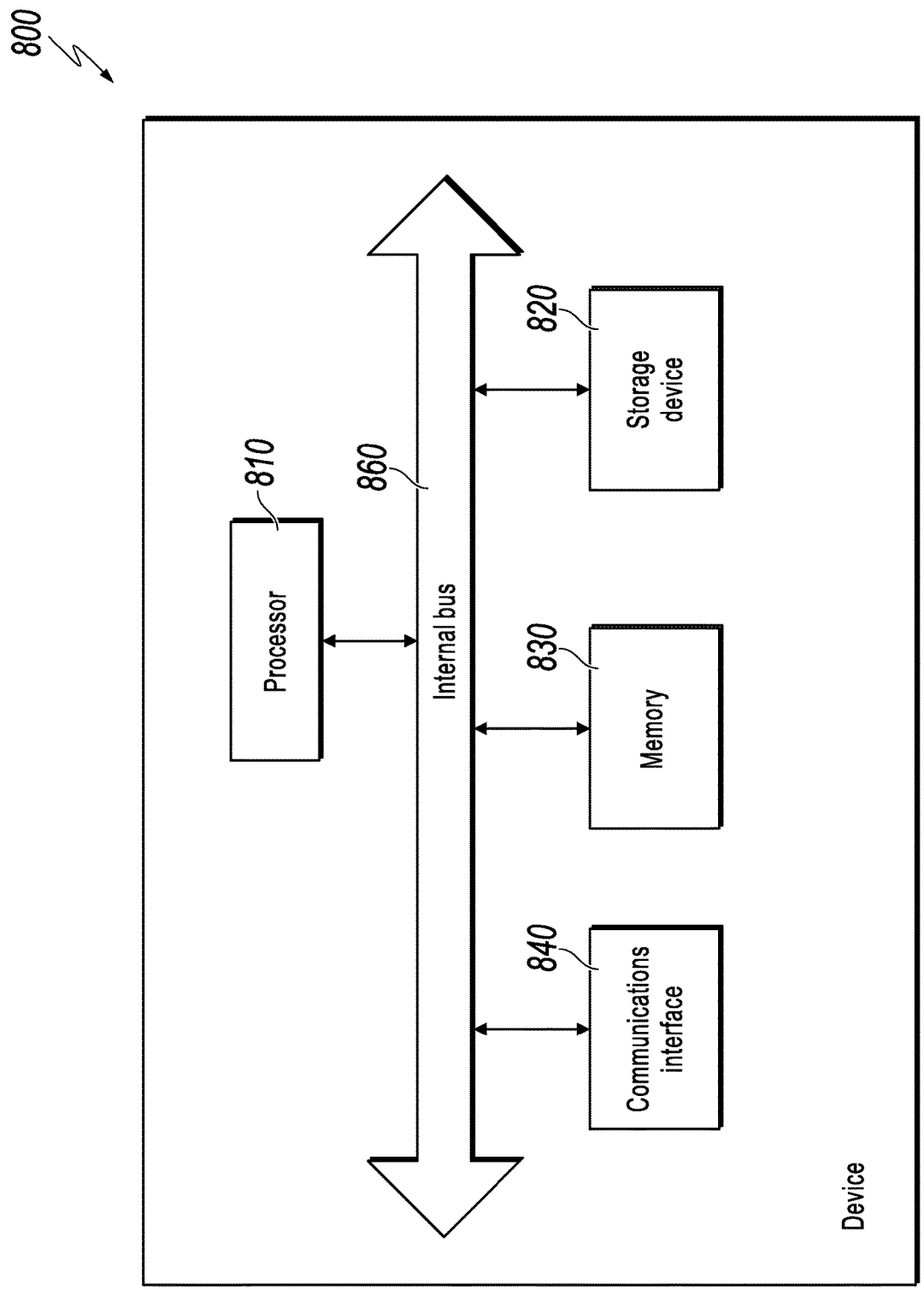
FIG. 8 is a hardware structural diagram illustrating a computing device for object distribution processing, according to an implementation of the present disclosure.

FIG. 8 is a hardware structural diagram illustrating a computing device 800 for object distribution processing, according to an implementation of the present disclosure. As shown in FIG. 8, the computing device 800 can include one or more processors 810, a storage device (for example, a non-volatile storage device) 820, a memory 830, a communications interface 840, and an internal bus 860. The processor 810, the storage device 820, the storage device 830, and the communications interface 840 are connected through the bus 860. The one or more processors 810 execute one or more computer readable instructions (that is, the previous elements that are implemented in a form of software) that are stored or coded in the storage device.

In an implementation, the storage unit stores a computer executable instruction, and when the instruction is executed, the one or more processors 810 is enabled to: obtain content of an object distribution transaction from a blockchain node in a blockchain network, where the content of an object distribution transaction includes a first transaction hash value specific to object information of objects to be distributed and an object distribution rule, and the object distribution rule specifies a distribution start time and an object distribution quantity; upon reaching the distribution start time, receive one or more object distribution requests from one or more clients, where the object distribution request includes a client identifier; determine one or more object distribution messages based on an order of respective times of receipt of the one or more object distribution requests and the object distribution quantity, where the object distribution message includes a client identifier and the first transaction hash value; and send each of the one or more object distribution messages to a client identified by the client identifier in the object distribution message.

It should be understood that when the computer readable instructions stored in the storage device 820 are executed, the one or more processors 810 is enabled to perform the operations and functions that are described above with reference to FIG. 2 to FIG. 7 in the implementations of the present disclosure.

In the present disclosure, the computing device 800 can include but is not limited to a personal computer, a server computer, a workstation, a desktop computer, a laptop computer, a notebook computer, a mobile computing device, a smartphone, a tablet computer, a cellular phone, a personal digital assistant (PDA), a handheld device, a message transceiver, a wearable computing device, and a consumer electronic device.

According to an implementation, a program product (for example, a machine readable medium) is provided. The machine readable medium can store instructions (that is, the previous elements that are implemented in a form of software), and when the instructions are executed by a machine, the machine is enabled to perform the operations and functions described above with reference to FIG. 1 to FIG. 8 in the implementations of the present disclosure. Specifically, a system or device equipped with a readable storage medium can be provided, and the readable storage medium stores software program code used for implementing the functions described in any one of the previous implementations, and the computer or processor of the system or device is enabled to read execute the instructions stored in the readable storage medium.

In this case, the functions in any one of the previous implementations can be implemented by using the program code read from the readable storage medium. Therefore, the computer readable code and the readable storage medium that stores the computer readable code constitute a part of the present disclosure.

Examples of the readable storage medium include a floppy disk, a hard disk, a magneto-optical disk, a compact disc (for example, CD-ROM, CD-R, CD-RW, DVD-ROM, DVD-RAM, DVD-RW, or DVD-RW) a magnetic tape, a volatile memory card, and ROM. Optionally, program code can be downloaded from a server or a cloud through a communications network.

A person skilled in the art should understand that various variations and modifications can be made to the implementations disclosed above without departing from the essence of the present disclosure. Therefore, the protection scope of the present disclosure should be defined by the appended claims.

It is worthwhile to note that not all the steps and units in the previous processes and system structural diagrams are mandatory. Some steps or units can be omitted based on an actual requirement. The execution sequence of the steps is not fixed, and can be determined based on a requirement. The device structures described in the previous implementations may be logical structure. That is, some units may be implemented by using one physical entity, may be implemented by using a plurality of physical entities, or may be jointly implemented by some components in a plurality of independent devices.

In the previous implementations, the hardware units or modules can be implemented mechanically or electrically. For example, a hardware unit, module, or processor can include a permanent dedicated circuit or logic (for example, a dedicated processor, an FPGA, or an ASIC) for performing corresponding operations. The hardware unit or processor can further include programmable logic or a programmable circuit (for example, a general-purpose processor or another programmable processor), and can be temporarily set by software to perform corresponding operations. A specific implementation (mechanically, a dedicated permanent circuit, or a temporarily set circuit) can be determined by taking both costs and time into consideration.

The foregoing has described example implementations with reference to specific implementations described with reference to the accompanying drawings, but this does not include all the implementations that can be implemented or that fall within the protection scope of the claims. The term "example" used through the present specification means "being used as an example", and does not mean "being preferred over" or "being advantageous over" other implementations. Specific implementations include specific details provided to facilitate understanding of the described technologies. However, these technologies can be implemented with these specific details. In some examples, well-known structures and devices are illustrated by using block diagrams to facilitate understanding of the concepts described in the implementations.

The previous descriptions about the content of the present disclosure are provided to enable a person of ordinary skill in the art to implement or use the content of the present disclosure. For a person of ordinary skill in the art, various modifications on the content of the present disclosure are apparent, and general principles defined in the present specification can be used for other variations without departing from the protection scope of the content of the present disclosure. Therefore, the content of the present disclosure is not limited to the examples and designs described in the present specification. Instead, the content of the present disclosure is consistent with the broadest scope of the principles and novel characteristics disclosed in the present specification.

The invention claimed is:

1. A computer-implemented method for a distribution process, comprising:

obtaining, by a first object distribution server of a cluster of one or more object distribution servers, a distributed AtomicInteger that is distributed between the first object distribution server and a second object distribution server of the cluster of one or more object distribution servers;

obtaining, by the first object distribution server, content of an object distribution transaction from a blockchain node in a blockchain network, wherein the content of the object distribution transaction is stored in the blockchain network and comprises a first transaction hash value specific to object information of a plurality of objects to be distributed, an object information signature generated using a private cryptographic key that is paired with a public cryptographic key, and an object distribution rule, wherein the object distribution rule specifies a distribution start time and an object distribution quantity;

upon reaching the distribution start time, receiving, by the first object distribution server, one or more object distribution requests from one or more clients, wherein each of the one or more object distribution requests comprises a client identifier;

adjusting, by the first object distribution server, the distributed AtomicInteger based on the one or more object distribution requests to count the one or more object distribution requests;

determining, by the first object distribution server, one or more timestamps corresponding to a receipt of each of the one or more object distribution requests;

determining, by the first object distribution server, an order of the one or more object distribution requests comprising sorting the one or more object distribution requests based on the one or more timestamps;

determining, by the first object distribution server, one or more object distribution messages based on the order of the one or more object distribution requests and the object distribution quantity, wherein each of the one or more object distribution messages comprises:

a client identifier, the public cryptographic key, and the first transaction hash value; and sending, by the first object distribution server, each of the one or more object distribution messages to a client identified by the corresponding client identifier in each object distribution message, wherein the first transaction hash value and the public cryptographic key stored in each of the one or more object distribution messages enables the client identified by the corresponding client identifier to verify the object information of the plurality of objects using the public cryptographic key to decrypt the object information signature.

2. The computer-implemented method of claim 1, wherein the content of the object distribution transaction comprises the distributed AtomicInteger, and determining the one or more object distribution messages based on the order of the one or more object distribution requests and the object distribution quantity comprises:

sorting the one or more object distribution requests by using the distributed AtomicInteger and based on the order of the one or more object distribution requests; and determining the one or more object distribution messages based on the sorted one or more object distribution requests and the object distribution quantity, wherein the distributed AtomicInteger is a class within a coding language.

3. The computer-implemented method of claim 1, wherein the object distribution rule specifies an object acquisition quantity limit, wherein the object acquisition quantity limit is used to indicate a limit on a quantity of objects that can be obtained by each client, and wherein determining the one or more object distribution messages based on the order of the one or more object distribution requests and the object distribution quantity comprises:

determining the one or more object distribution messages based on the order of the one or more object distribution requests, the object distribution quantity, and the object acquisition quantity limit.

4. The computer-implemented method of claim 1, wherein the content of the object distribution transaction comprises the public cryptographic key paired with the private cryptographic key, wherein the first transaction hash value is a hash value specific to the object information of the plurality of objects to be distributed and the object information signature, wherein the object information signature is obtained by encrypting the object information by using the private cryptographic key that is paired with the public cryptographic key, and wherein the object information comprises the public cryptographic key used by the client identified by the corresponding client identifier to verify the object information.

5. The computer-implemented method of claim 1, wherein obtaining the content of the object distribution transaction from the blockchain node comprises:

obtaining a second transaction hash value from the blockchain node, wherein the second transaction hash value is a hash value specific to the content of the object distribution transaction; and obtaining the content of the object distribution transaction from the blockchain node based on the second transaction hash value.

6. The computer-implemented method of claim 1, before determining the one or more object distribution messages based on the order of the one or more object distribution requests and the object distribution quantity, the method further comprises:

performing qualification filtering on the one or more object distribution requests, and determining the one or more object distribution messages based on the order of the one or more object distribution requests and the object distribution quantity comprises:

determining the one or more object distribution messages based on the order of the one or more object distribution requests on which the qualification filtering is performed and the object distribution quantity.

7. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for object distribution, wherein the operations comprise:

obtaining, by a first object distribution server of a cluster of one or more object distribution servers, a distributed AtomicInteger that is distributed between the first object distribution server and a second object distribution server of the cluster of one or more object distribution servers;

obtaining, by the first object distribution server, content of an object distribution transaction from a blockchain node in a blockchain network, wherein the content of the object distribution transaction is stored in the blockchain network and comprises a first transaction hash value specific to object information of a plurality of objects to be distributed, an object information signature generated using a private cryptographic key that is paired with a public cryptographic key, and an object distribution rule, wherein the object distribution rule specifies a distribution start time and an object distribution quantity;

upon reaching the distribution start time, receiving, by the first object distribution server, one or more object distribution requests from one or more clients, wherein each of the one or more object distribution requests comprises a client identifier;

adjusting, by the first object distribution server, the distributed AtomicInteger based on the one or more object distribution requests to count the one or more object distribution requests;

determining, by the first object distribution server, one or more timestamps corresponding to a receipt of each of the one or more object distribution requests;

determining, by the first object distribution server, an order of the one or more object distribution requests comprising sorting the one or more object distribution requests based on the one or more timestamps;

determining, by the first object distribution server, one or more object distribution messages based on the order of the one or more object distribution requests and the object distribution quantity, wherein each of the one or more object distribution messages comprises:

a client identifier, the public cryptographic key, and the first transaction hash value; and sending, by the first object distribution server, each of the one or more object distribution messages to a client identified by the corresponding client identifier in each object distribution message, wherein the first transaction hash value and the public cryptographic key stored in each of the one or more object distribution messages enables the client identified by the corresponding client identifier to verify the object information of the plurality of objects using the public cryptographic key to decrypt the object information signature.

8. The computer-implemented system of claim 7, wherein the content of the object distribution transaction comprises the distributed AtomicInteger, and
determining the one or more object distribution messages based on the order of the one or more object distribution requests and the object distribution quantity comprises:
sorting the one or more object distribution requests by using the distributed AtomicInteger and based on the order of the one or more object distribution requests; and
determining the one or more object distribution messages based on the sorted one or more object distribution requests and the object distribution quantity,
wherein the distributed AtomicInteger is a class within a coding language.

9. The computer-implemented system of claim 7, wherein the object distribution rule specifies an object acquisition quantity limit, wherein the object acquisition quantity limit is used to indicate a limit on a quantity of objects that can be obtained by each client, and
wherein determining the one or more object distribution messages based on the order of the one or more object distribution requests and the object distribution quantity comprises:
determining the one or more object distribution messages based on the order of the one or more object distribution requests, the object distribution quantity, and the object acquisition quantity limit.

10. The computer-implemented system of claim 7, wherein the content of the object distribution transaction comprises the public cryptographic key paired with the private cryptographic key, wherein the first transaction hash value is a hash value specific to the object information of the plurality of objects to be distributed and the object information signature, wherein the object information signature is obtained by encrypting the object information by using the private cryptographic key that is paired with the public cryptographic key, and wherein
the object information comprises the public cryptographic key used by the client identified by the corresponding client identifier to verify the object information.

11. The computer-implemented system of claim 7, wherein obtaining the content of the object distribution transaction from the blockchain node comprises:
obtaining a second transaction hash value from the blockchain node, wherein the second transaction hash value is a hash value specific to the content of the object distribution transaction; and
obtaining the content of the object distribution transaction from the blockchain node based on the second transaction hash value.

12. The computer-implemented system of claim 7, before determining the one or more object distribution messages based on the order of the one or more object distribution requests and the object distribution quantity, the operations further comprising:
performing qualification filtering on the one or more object distribution requests, and
determining the one or more object distribution messages based on the order of the one or more object distribution requests and the object distribution quantity comprises:
determining the one or more object distribution messages based on the order of the one or more object distribution requests on which the qualification filtering is performed and the object distribution quantity.

13. A non-transitory, computer-readable medium storing one or more instructions executable by a computer system to perform operations for object distribution, comprising:
obtaining, by a first object distribution server of a cluster of one or more object distribution servers, a distributed AtomicInteger that is distributed between the first object distribution server and a second object distribution server of the cluster of one or more object distribution servers;
obtaining, by the first object distribution server, content of an object distribution transaction from a blockchain node in a blockchain network, wherein the content of the object distribution transaction is stored in the blockchain network and comprises a first transaction hash value specific to object information of a plurality of objects to be distributed, an object information signature generated using a private cryptographic key that is paired with a public cryptographic key, and an object distribution rule, wherein the object distribution rule specifies a distribution start time and an object distribution quantity;
upon reaching the distribution start time, receiving, by the first object distribution server, one or more object distribution requests from one or more clients, wherein each of the one or more object distribution requests comprises a client identifier;
adjusting, by the first object distribution server, the distributed AtomicInteger based on the one or more object distribution requests to count the one or more object distribution requests;
determining, by the first object distribution server, one or more timestamps corresponding to a receipt of each of the one or more object distribution requests;
determining, by the first object distribution server, an order of the one or more object distribution requests comprising sorting the one or more object distribution requests based on the one or more timestamps;
determining, by the first object distribution server, one or more object distribution messages based on the order of the one or more object distribution requests and the object distribution quantity, wherein each of the one or more object distribution messages comprises:
a client identifier,
the public cryptographic key, and
the first transaction hash value; and
sending, by the first object distribution server, each of the one or more object distribution messages to a client identified by the corresponding client identifier in each object distribution message, wherein the first transaction hash value and the public cryptographic key stored in each of the one or more object distribution messages enables the client identified by the corresponding client identifier to verify the object information of the plurality of objects using the public cryptographic key to decrypt the object information signature.

14. The non-transitory, computer-readable medium of claim 13, wherein the content of the object distribution transaction comprises the distributed AtomicInteger, and determining the one or more object distribution messages based on the order of the one or more object distribution requests and the object distribution quantity comprises:
- sorting the one or more object distribution requests by using the distributed AtomicInteger and based on the order of the one or more object distribution requests; and
- determining the one or more object distribution messages based on the sorted one or more object distribution requests and the object distribution quantity,
- wherein the distributed AtomicInteger is a class within a coding language.

15. The non-transitory, computer-readable medium of claim 13, wherein the object distribution rule specifies an object acquisition quantity limit, wherein the object acquisition quantity limit is used to indicate a limit on a quantity of objects that can be obtained by each client, and
- wherein determining the one or more object distribution messages based on the order of the one or more object distribution requests and the object distribution quantity comprises:
- determining the one or more object distribution messages based on the order of the one or more object distribution requests, the object distribution quantity, and the object acquisition quantity limit.

16. The non-transitory, computer-readable medium of claim 13, wherein the content of the object distribution transaction comprises the public cryptographic key paired with the private cryptographic key, wherein the first transaction hash value is a hash value specific to the object information of the plurality of objects to be distributed and the object information signature, wherein the object information signature is obtained by encrypting the object information by using the private cryptographic key that is paired with the public cryptographic key, and wherein
- the object information comprises the public cryptographic key used by the client identified by the corresponding client identifier to verify the object information.

17. The non-transitory, computer-readable medium of claim 13, wherein obtaining the content of the object distribution transaction from the blockchain node comprises:
- obtaining a second transaction hash value from the blockchain node, wherein the second transaction hash value is a hash value specific to the content of the object distribution transaction; and
- obtaining the content of the object distribution transaction from the blockchain node based on the second transaction hash value.

18. The non-transitory, computer-readable medium of claim 13, before determining the one or more object distribution messages based on the order of the one or more object distribution requests and the object distribution quantity, the operations further comprising:
- performing qualification filtering on the one or more object distribution requests, and
- determining the one or more object distribution messages based on the order of the one or more object distribution requests and the object distribution quantity comprises:
- determining the one or more object distribution messages based on the order of the one or more object distribution requests on which the qualification filtering is performed and the object distribution quantity.

19. The non-transitory, computer-readable medium of claim 13, wherein an object provider device or the first object distribution server is the blockchain node in the blockchain network.

* * * * *

UNITED STATES PATENT AND TRADEMARK OFFICE
CERTIFICATE OF CORRECTION

PATENT NO. : 11,501,295 B2
APPLICATION NO. : 16/779239
DATED : November 15, 2022
INVENTOR(S) : Guojun Ye It is certified that error appears in the above-identified patent and that said Letters Patent is hereby corrected as shown below:

In the Claims

Column 21, Line 15, in Claim 2, delete "AtomicInteger," and insert -- AtomicInteger, --.

Column 21, Line 21, in Claim 2, delete "AtomicInteger," and insert -- AtomicInteger, --.

Column 21, Line 27, in Claim 2, delete "AtomicInteger," and insert -- AtomicInteger, --.

Column 23, Line 9, in Claim 8, delete "AtomicInteger," and insert -- AtomicInteger, --.

Column 23, Line 15, in Claim 8, delete "AtomicInteger," and insert -- AtomicInteger, --.

Column 23, Line 22, in Claim 8, delete "AtomicInteger," and insert -- AtomicInteger, --.

Column 24, Line 67, in Claim 14, delete "AtomicInteger," and insert -- AtomicInteger, --.

Column 25, Line 6, in Claim 14, delete "AtomicInteger," and insert -- AtomicInteger, --.

Column 25, Line 13, in Claim 14, delete "AtomicInteger," and insert -- AtomicInteger, --.

Signed and Sealed this
Twenty-fourth Day of January, 2023

Katherine Kelly Vidal
*Director of the United States Patent and Trademark Office*